United States Patent
Israni et al.

(10) Patent No.: US 11,625,274 B1
(45) Date of Patent: *Apr. 11, 2023

(54) HYPER-CONVERGENCE WITH SCHEDULER EXTENSIONS FOR SOFTWARE-DEFINED CONTAINER STORAGE SOLUTIONS

(71) Applicant: Portworx, Inc., Los Altos, CA (US)

(72) Inventors: Dinesh Israni, San Jose, CA (US); Vinod Jayaraman, San Francisco, CA (US); Goutham Rao, Los Altos, CA (US)

(73) Assignee: Pure Storage, Inc., Mountain View, CA (US)

( * ) Notice: Subject to any disclaimer, the term of this patent is extended or adjusted under 35 U.S.C. 154(b) by 225 days.

This patent is subject to a terminal disclaimer.

(21) Appl. No.: 17/089,691

(22) Filed: Nov. 4, 2020

Related U.S. Application Data (63) Continuation of application No. 15/907,181, filed on Feb. 27, 2018, now Pat. No. 10,831,540.

(51) Int. Cl.
| | |
|---|---|
| *G06F 9/46* | (2006.01) |
| *G06F 9/50* | (2006.01) |
| *G06F 9/48* | (2006.01) |
| *G06F 3/06* | (2006.01) |

(52) U.S. Cl.
CPC .......... *G06F 9/5016* (2013.01); *G06F 3/0662* (2013.01); *G06F 9/4881* (2013.01); *G06F 2003/0697* (2013.01)

(58) Field of Classification Search
CPC .... G06F 9/5016; G06F 9/4881; G06F 3/0662; G06F 2003/0697
See application file for complete search history.

(56) References Cited

U.S. PATENT DOCUMENTS

| | | | |
|---|---|---|---|
| 8,418,181 | B1 | 4/2013 | Sirota et al. |
| 9,594,653 | B1 | 3/2017 | Misra et al. |
| 10,133,619 | B1 | 11/2018 | Nagpal et al. |
| 10,732,995 | B2 | 8/2020 | Israni et al. |
| 10,831,540 | B2 | 11/2020 | Israni et al. |
| 2015/0149615 | A1 | 5/2015 | Broussard et al. |
| 2018/0046503 | A1 | 2/2018 | Feng et al. |
| 2019/0065096 | A1 | 2/2019 | Sterin et al. |
| 2019/0102265 | A1 | 4/2019 | Ngo et al. |
| 2019/0235764 | A1 | 8/2019 | Lan et al. |

(Continued)

OTHER PUBLICATIONS

U.S. Appl. No. 15/907,181, Notice of Allowance and Fees Due (Ptol-85), dated Sep. 2, 2020, 8 pgs.

(Continued)

*Primary Examiner* — Diem K Cao
(74) *Attorney, Agent, or Firm* — ALG Intellectual Property, LLC (57) ABSTRACT

A clustered storage system may include potentially many different nodes, each including a storage driver and a scheduler agent. A node may mount a virtual storage volume for the use of a container application at the node. When a master node receives a request to instantiate a new containerized application, a scheduler at the master node may determine prioritization information for the new containerized application. The prioritization information may prioritize one or more nodes at which a virtualized storage volume employed by the application container instance is mounted.

20 Claims, 8 Drawing Sheets

(56) References Cited

U.S. PATENT DOCUMENTS

2019/0266022 A1  8/2019  Israni et al.
2020/0364063 A1  11/2020  Israni et al.

OTHER PUBLICATIONS

U.S. Appl. No. 15/907,181, Advisory Action (Ptol-303), dated Jul. 20, 2020, 2 pgs.
U.S. Appl. No. 15/907,181, Final Rejection, dated Apr. 29, 2020, 10 pgs.
U.S. Appl. No. 15/907,181, Non-Final Rejection, dated Oct. 15, 2019, 9 pgs.

HYPER-CONVERGENCE WITH SCHEDULER EXTENSIONS FOR SOFTWARE-DEFINED CONTAINER STORAGE SOLUTIONS

CROSS-REFERENCE TO RELATED APPLICATIONS

The present application is a continuation of, and claims priority to, U.S. patent application Ser. No. 15/907,181 (PSTGP011) by Dinesh Israni, et al., filed Feb. 27, 2018, which is incorporated herein by reference in its entirety and for all purposes.

TECHNICAL FIELD

The present disclosure relates generally to containerized applications and more specifically to containerized scalable storage applications.

DESCRIPTION OF RELATED ART

One of the most difficult challenges facing software developers is interoperability of software between different computing environments. Software written to run in one operating system typically will not run without modification in a different operating system. Even within the same operating system, a program may rely on other programs in order to function. Each of these dependencies may or may not be available on any given system, or may be available but in a version different from the version originally relied upon. Thus, dependency relationships further complicate efforts to create software capable of running in different environments.

In recent years, the introduction of operating-system-level virtualization has facilitated the development of containerized software applications. A system configured with operating-system-level virtualization includes a container engine that operates on top of the operating system. Importantly, the container engine is configured to operate interchangeably in different environments (e.g., with different operating systems). At the same time, the container engine is configured to present a standardized interface to one or more software containers.

Each software container may include computer programming code for performing one or more tasks. Examples of software containers include web servers, email servers, web applications, and other such programs. Each software container may include some or all of the software resources that the software in the container needs in order to function. For example, if a software container includes a web application written in the Python programming language, the software container may also include the Python programming language modules that the web application relies upon. In this way, the software container may be installed and may execute successfully in different computing environments as long as the environment includes a container engine.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Various embodiments of the present invention relate generally to devices, systems, and methods, and non-transitory machine-readable media having instructions stored thereon for facilitating hyper-convergence via scheduler extensions for software-defined container storage solutions. According to various embodiments, a system may include a plurality of containerized application nodes that are each implemented on a respective computing device that includes a respective processor and memory. Each containerized application node may include a storage driver configured to provide access to one or more virtual storage volumes mounted at the containerized application node. Each containerized application node may also include a scheduler agent configured to instantiate containerized applications at the containerized application node upon request.

In some embodiments, the system may also include a master node that includes a scheduler and a prioritization module. The master node may be in communication with each of the containerized application nodes via a network. The prioritization module may be configured to determine node prioritization information indicating a relative prioritization of the containerized application nodes for instantiating a designated containerized application, which may be configured to access a designated one of the virtual storage volumes. The prioritization information for a designated one of the containerized application nodes may be determined at least in part based on whether the designated virtual storage volume is mounted at the designated containerized application node.

In some implementations, the system may also include a storage pool that includes a plurality of physical storage devices accessible via the network. Selected ones of the physical storage devices may store data associated with one or more of the virtual volumes.

In particular embodiments, the master node and/or each of the plurality of containerized application nodes may include a respective instance of a container engine application executed by an operating system. The container engine application may provide a standardized platform for the instantiation and execution of the containerized applications. The scheduler may be a native component of the container engine application. The prioritization module may be implemented via a scheduler extender that supports a plurality of modules that extend the logic of the scheduler. The plurality of modules may include the prioritization module.

In particular embodiments, the instantiated containerized applications at each of the containerized application nodes may include the storage driver. The prioritization information for the designated containerized application nodes may be determined at least in part based on whether the designated containerized application node is in a failed, non-response, or errored state. The prioritization information for the designated containerized application nodes may be determined at least in part based on node performance information indicates a computing workload associated with the containerized application node.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular containerized storage environments. However, it should be noted that the techniques of the present invention apply to a wide variety of different containerized storage environments. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, techniques and mechanisms described herein employ a container-specific rather than an OS-specific augmentation that influences a container scheduler to schedule nodes based on the virtual storage volumes used by a particular container. In particular, the scheduler extension may be used to cause the scheduler to prefer nodes where data for a stateful container is located. As part of the prioritization request from the scheduler to the extension, the scheduler can pass in details about containers such as the volumes that are being used by the container. The extender may then receive the query and check if the container is using any persistent volumes backed by the software-defined storage solution. If there is such a persistent volume, then the extender may query the storage driver to identify the nodes where the data is located.

EXAMPLE EMBODIMENTS

In a containerized application system such as Docker, each compute node implements a container layer that runs in an operating system. The container layer acts as an intermediate layer to facilitate the execution of one or more container applications. The container system is standardized so that a container application may be instantiated on any of various operating systems and on any of various types of hardware.

In many configurations, potentially many instances of a container application are created on potentially many different nodes. A clustered storage solution can be employed to provide access to data. In a clustered storage solution, a virtual storage volume can be created. Such a virtual storage volume can span potentially many different physical disks and can be made accessible to any of the nodes.

The process of making a virtual storage volume available for writing on a disk attached to a particular storage node is referred to as "mounting". Importantly, the clustered storage solution must ensure that a virtual storage volume is mounted for writing by no more than a single node since simultaneous writes by different nodes tends to quickly corrupt a storage volume.

In a clustered storage solution for containers, schedulers are in charge of moving around volume mount points across a cluster so that containers always have access to their persistent data. Examples of schedulers may include, but are not limited to: Kubernetes, Mesos, and Swarm.

According to various embodiments, a set of nodes may be initialized to provide an array of software services such as web applications supported by databases and web servers. Because many of these applications rely on reading or writing data to and from storage devices, a storage driver may be used to attach virtual volumes to nodes to provide access to storage.

According to various embodiments, a containerized application system in which software services are provided by application instances implemented across multiple nodes provides several advantages, such as scalability and dependency management. However, such a configuration creates substantial performance challenges. For example, if a database is implemented on one node while the storage volume used to manage data accessed by the database is mounted on another node, then performance may degrade significantly because every database read or write may require inter-node communication.

According to various embodiments, performance may be improved by employing a converged architecture. Converged storage is a storage architecture that combines storage and computing resources into a single entity. For example, by locating on the same node both a web application that serves files and the virtual volume at which those files are stored, performance may be improved.

In some embodiments, a hyperconverged architecture extends the concept of convergence to a virtualized architecture such as a containerized application system. Hyperconverged storage is a software-defined approach to storage management that combines storage, computation, and virtualization in a physical unit that is managed as a single system. In contrast to a converged architecture, storage in a hyperconverged architecture need not be directly attached to a physical server, but rather may be accessible as a virtualized storage solution with the physical storage located at a different network endpoint.

Despite the performance benefits of a hyperconverged architecture, implementing such a system in a scalable and distributed fashion presents significant challenges under conventional approaches. For example, the particular scheduling decisions made when supporting a hyperconverged architecture are highly dependent upon the nature of the storage solution and applications. Thus, it is anticipated that a one-size-fits all hyperconvergence solution implemented in a scheduler will fail to accommodate the specific needs of the various possible arrangements of distributed storage and applications and thus fail to provide substantial performance benefits.

Alternately, a conventional system may include a customized scheduler that is designed to support hyperconvergence in a specific context that includes a particular configuration of distributed storage and application container instances. However, when the standard scheduler on which the customized scheduler is based is updated, then the customized component of the customized scheduler must also be updated to account for these changes. Thus, a customized scheduler may require constant maintenance and/or may quickly fall out of date.

According to various embodiments, techniques and mechanisms described herein allow a distributed and containerized application system to achieve hyperconvergence without altering the standard scheduler provided in such a system. In this way, the benefits of hyperconvergence may be obtained while at the same time retaining the benefits of a secure and updated scheduler. Further, hyperconvergence may be obtained without requiring expensive, complex, and costly alterations to a standardized scheduler.

According to various embodiments, techniques and mechanisms described herein provide for substantially improved performance of the computer itself under some configurations. For example, by achieving a hyperconverged architecture, inter-node network traffic may be substantially reduced. Further, application response time may be reduced by reducing the time required for storage-related operations. Also, the hyperconverged architecture provides for improved scalability since additional nodes may be added to the system without substantially increasing the node-to-node network traffic.

In some embodiments, techniques and mechanisms described herein provide for a scheduler extender that includes one or more modules that each extend the functionality of the scheduler. The scheduler extender may serve as an API that provides a point at which different modules may attach. Under such an architecture, the prioritization module and the scheduler may be independently architected and updated.

In particular embodiments, many native container schedulers allow extensions to be implemented which can be used to provide additional intelligence to the scheduler. These extensions can be used to instruct the scheduler to exclude nodes under maintenance or to prefer nodes with more resources available.

According to various embodiments, techniques and mechanisms described herein provide for substantially improved performance of applications that include multiple containers implemented on different nodes and that employ software-defined storage. These performance gains may be provided without modifying the native scheduler application. The extender may also reschedule or refuse to schedule application container instances on nodes that are in a failed or errored state.

According to various embodiments, the prioritization module may support a "best effort" approach when scheduling application container instances. For example, the prioritization module may provide prioritization information for a required application container instances that indicates which nodes would provide the greatest performance benefits for locating the application container instance.

In particular embodiments, the performance of any or most stateful containerized application may benefit from hyperconvergence prioritization. Applications that may particularly benefit include applications with frequent syncs and small reads and/or writes, such as database applications.

Techniques and mechanisms described herein may facilitate the operation of a scalable storage container node system. In some embodiments, a scalable storage container node system may allow application containers in a virtualized application system to quickly and directly provision and scale storage. Further, the system may be configured to provide one or more user experience guarantees across classes of applications. According to various embodiments, the system may pool the capacity of different services into virtual storage volumes and auto-allocate storage as application storage traffic scales or bursts. For instance, a single virtual storage volume may include hundreds or thousands of terabytes of storage space aggregated across many different storage devices located on many different physical machines.

In some embodiments, storage containers may communicate directly with server resources such as hardware storage devices, thus reducing or eliminating unnecessary virtualization overhead. Storage containers may be configured for implementation in a variety of environments, including both local computing environments and cloud computing environments. In some implementations, storage volumes created according to the techniques and mechanisms described herein may be highly failure-tolerant. For example, a virtual storage volume may include data stored on potentially many different storage nodes. A storage node may fail for any of various reasons, such as hardware failure, network failure, software failure, or server maintenance. Data integrity may be maintained even if one or more nodes that make up a storage volume fail during data storage operations.

According to various embodiments, a storage system that allows access by different computing devices is referred to herein as a "distributed storage system." Alternately, or additionally, such a storage system may be referred to herein as a "clustered storage system."

Figure 1:
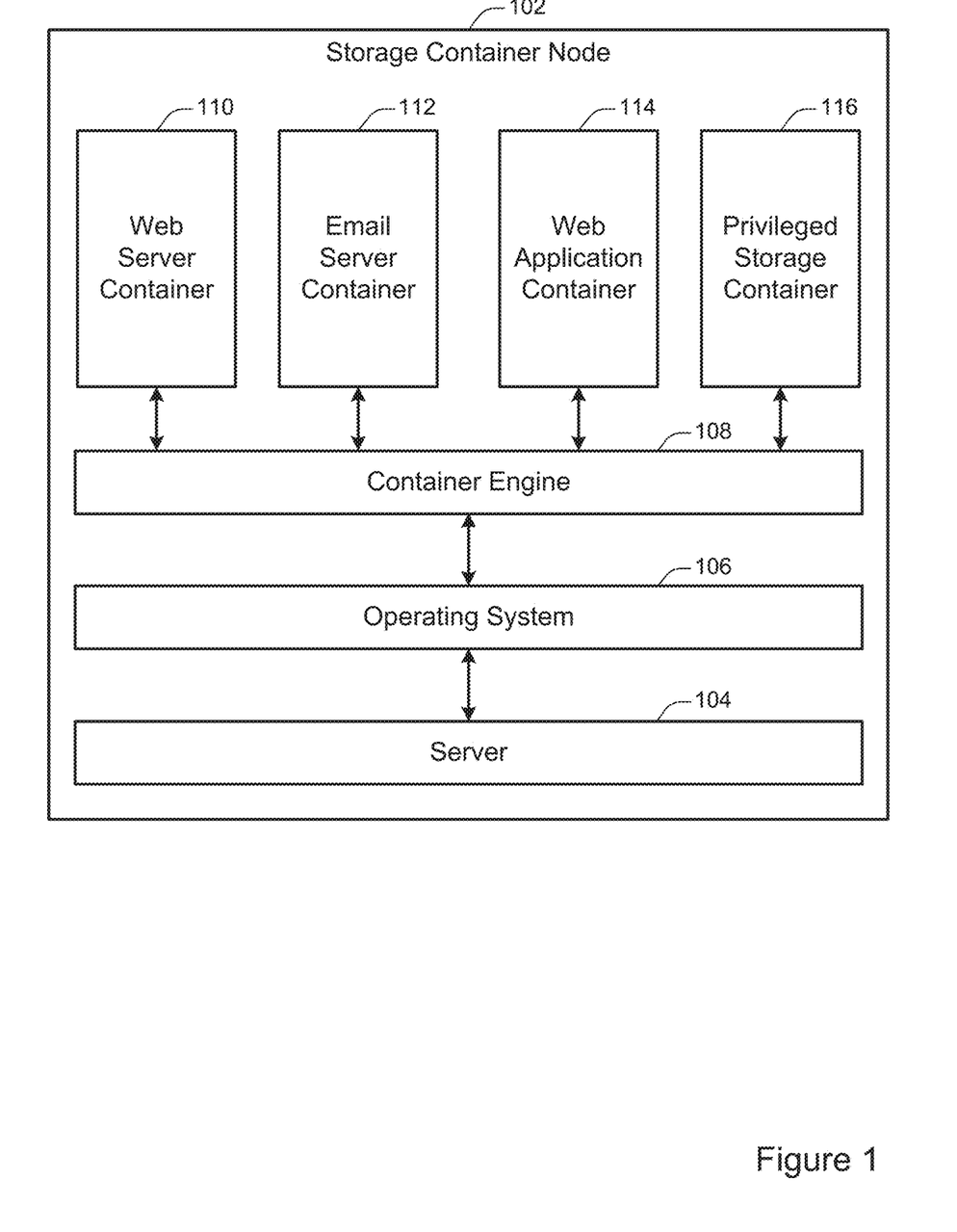
FIG. 1 illustrates an example of a storage container node, configured in accordance with one or more embodiments.

FIG. 1 illustrates an example of a storage container node 102. According to various embodiments, a storage container node may be a server configured to include a container engine and a privileged storage container. The storage container node 102 shown in FIG. 1 includes a server layer 104, an operating system layer 106, a container engine 108, a web server container 110, an email server container 112, a web application container 114, and a privileged storage container 116.

In some embodiments, the storage container node 102 may serve as an interface between storage resources available at a server instance and one or more virtual storage volumes that span more than one physical and/or virtual server. For example, the storage container node 102 may be implemented on a server that has access to a storage device. At the same time, a different storage container node may be implemented on a different server that has access to a different storage device. The two storage nodes may communicate to aggregate the physical capacity of the different storage devices into a single virtual storage volume. The single virtual storage volume may then be accessed and addressed as a unit by applications running on the two storage nodes or at on another system.

In some embodiments, the storage container node 102 may serve as an interface between storage resources available at a server instance and one or more virtual storage volumes that are replicated across more than one physical and/or virtual server. For example, the storage container node 102 may be implemented on a server that has access to a storage volume implemented on one or more storage devices. At the same time, a different storage container node may be implemented on a different server that has access to the same storage volume. The two storage nodes may then each access data stored on the same storage volume. Additional details regarding the configuration of multiple storage container nodes in the same system are discussed with respect to FIG. 2.

At 104, the server layer is shown. According to various embodiments, the server layer may function as an interface by which the operating system 106 interacts with the server on which the storage container node 102 is implemented. A storage container node may be implemented on a virtual or physical server. For example, the storage container node 102 may be implemented at least in part on the server shown in FIG. 5. The server may include hardware such as networking components, memory, physical storage devices, and other such infrastructure. The operating system layer 106 may communicate with these devices through a standardized interface provided by the server layer 104.

At 106, the operating system layer is shown. According to various embodiments, different computing environments may employ different operating system layers. For instance, a physical or virtual server environment may include an operating system based on Microsoft Windows, Linux, or Apple's OS X. The operating system layer 106 may provide, among other functionality, a standardized interface for communicating with the server layer 104.

At 108, a container engine layer is shown. According to various embodiments, the container layer may provide a common set of interfaces for implementing container applications. For example, the container layer may provide application programming interfaces (APIs) for tasks related to storage, networking, resource management, or other such computing tasks. The container layer may abstract these computing tasks from the operating system. A container engine may also be referred to as a hypervisor, a virtualization layer, or an operating-system-virtualization layer.

In some implementations, the separation of the computing environment into a server layer 104, an operating system layer 106, and a container engine layer 108 may facilitate greater interoperability between software applications and greater flexibility in configuring computing environments. For example, the same software container may be used in different computing environments, such as computing environments configured with different operating systems on different physical or virtual servers.

At storage container node may include one or more software containers. For example, the storage container node 102 includes the web server container 120, the email server container 112, and the web application container 114. A software container may include customized computer code configured to perform any of various tasks. For instance, the web server container 120 may provide files such as webpages to client machines upon request. The email server 112 may handle the receipt and transmission of emails as well as requests by client devices to access those emails. The web application container 114 may be configured to execute any type of web application, such as an instant messaging service, an online auction, a wiki, or a webmail service. Although that storage container node 102 shown in FIG. 1 includes three software containers, other storage container nodes may include various numbers and types of software containers.

At 116, a privileged storage container is shown. According to various embodiments, the privileged storage container may be configured to facilitate communications with other storage container nodes to provide one or more virtual storage volumes. A virtual storage volume may serve as a resource for storing or retrieving data. The virtual storage volume may be accessed by any of the software containers 110, 112, and 114 or other software containers located in different computing environments. For example, a software container may transmit a storage request to the container engine 108 via a standardized interface. The container engine 108 may transmit the storage request to the privileged storage container 116. The privileged storage container 116 may then communicate with privileged storage containers located on other storage container nodes and/or may communicate with hardware resources located at the storage container node 102 to execute the request.

In some implementations, one or more software containers may be afforded limited permissions in the computing environment in which they are located. For example, in order to facilitate a containerized software environment, the software containers 110, 112, and 114 may be restricted to communicating directly only with the container engine 108 via a standardized interface. The container engine 108 may then be responsible for relaying communications as necessary to other software containers and/or the operating system layer 106.

In some implementations, the privileged storage container 116 may be afforded additional privileges beyond those afforded to ordinary software containers. For example, the privileged storage container 116 may be allowed to communicate directly with the operating system layer 106, the server layer 104, and/or one or more physical hardware components such as physical storage devices. Providing the storage container 116 with expanded privileges may facilitate efficient storage operations such as storing, retrieving, and indexing data.

Figure 2:
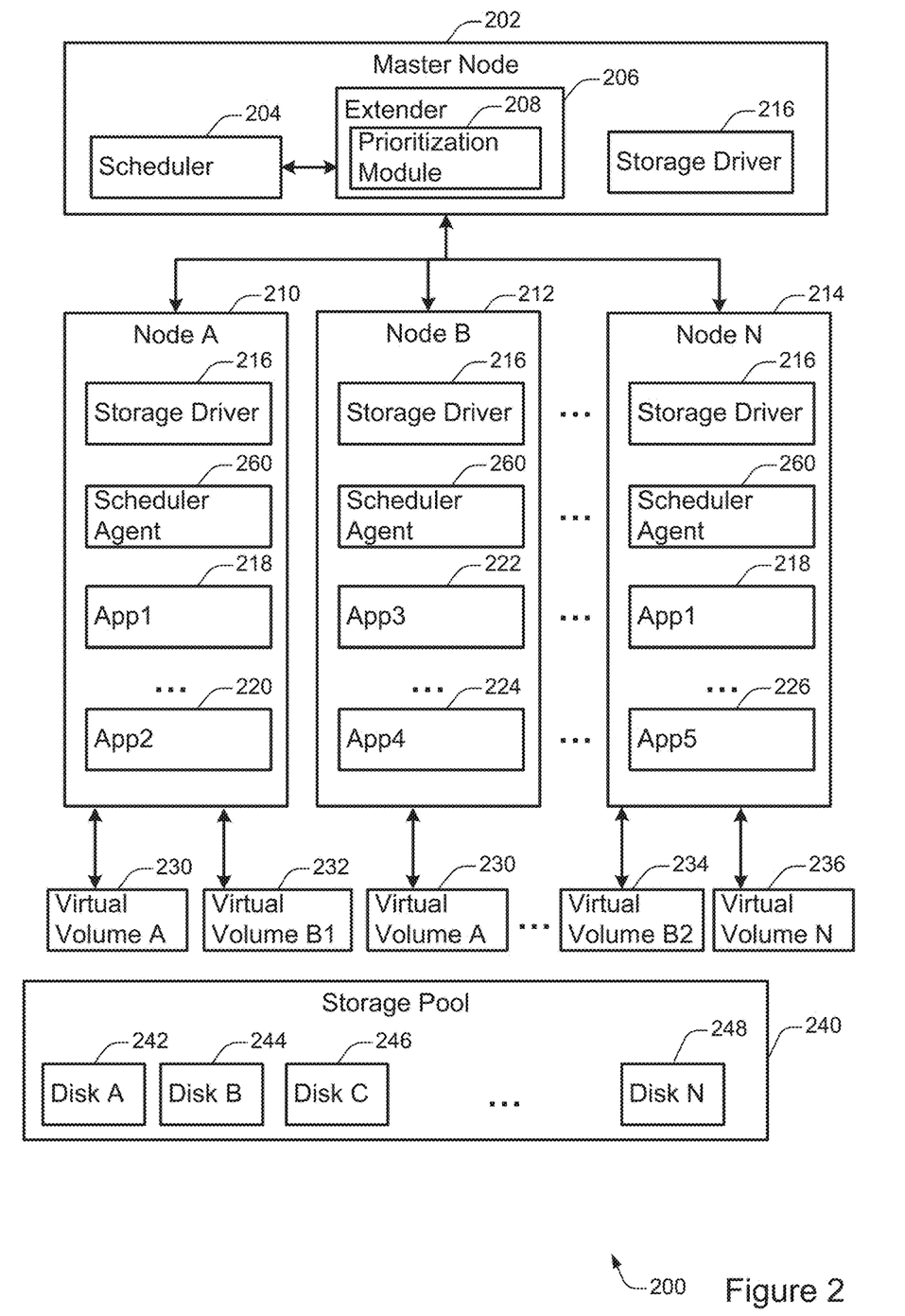
FIG. 2 illustrates an example of an arrangement of components in a containerized storage system, configured in accordance with one or more embodiments.

FIG. 2 illustrates an example of an arrangement of components in a containerized storage system 200, configured in accordance with one or more embodiments. The storage system 200 includes a master node 202 in communication with a plurality of application nodes 210, 212, and 214. Each node has implemented thereon a storage driver 216, In addition, the master node includes a scheduler 204 that has access to an extender 206 that includes a prioritization module 208. Each node can mount one or more of a plurality of virtual volumes 230, 232, 234, and 236. Each virtual volume can include storage space on one or more of a plurality of storage disks 242, 244, 246, and 248 in a storage pool 240.

According to various embodiments, the clustered storage system 200 shown in FIG. 2 may be implemented in any of various physical computing contexts. For example, some or all of the components shown in FIG. 2 may be implemented in a cloud computing environment such as Amazon Web Services (AWS), Microsoft Azure, or Google Cloud. As another example, some or all of the components shown in FIG. 2 may be implemented in a local computing environment such as on nodes in communication via a local area network (LAN) or other privately managed network.

Figure 5:
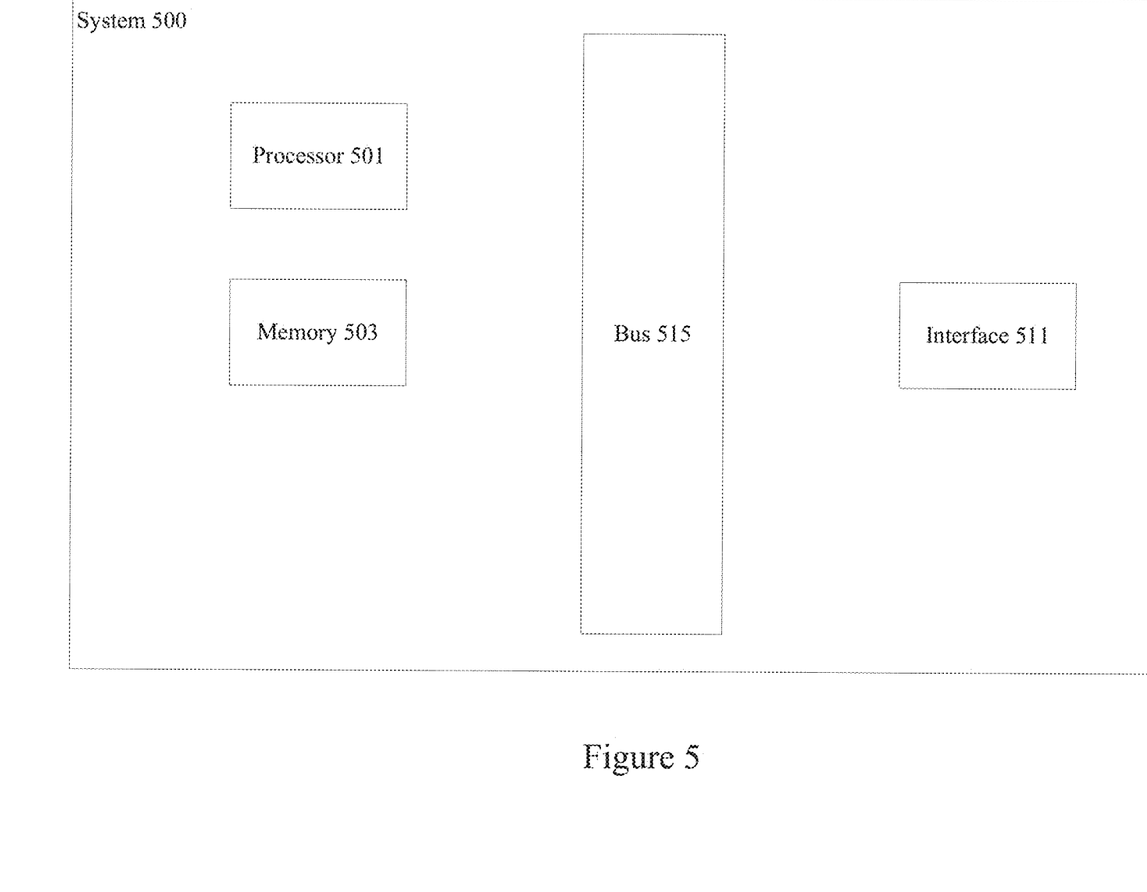
FIG. 5 illustrates an example of a server, configured in accordance with one or more embodiments.

In some implementations, a node is an instance of a container system implemented on a computing device such as the computing device shown in FIG. 5. In some configurations, multiple nodes may be implemented on the same physical computing device. Alternately, a computing device may contain a single node. An example configuration of a container node is discussed in further detail with respect to FIG. 1.

According to various embodiments, each node may be configured to instantiate and execute one or more containerized application instance. Each node may include many components not shown in FIG. 2. These components may include hardware and/or software components, such as those discussed with respect to FIG. 1 and FIG. 5.

According to various embodiments, each node may include a storage driver 216. The storage driver 216 may perform any of various types of storage-related operations for the node. For example, the storage driver 216 may facilitate the mounting or unmounting of virtual storage volumes. As another example, the storage driver 216 may facilitate data storage or retrieval requests associated with a mounted virtual storage volume. In some embodiments, the storage driver 216 may be substantially similar or identical to the privileged storage container 116 shown in FIG. 1.

According to various embodiments, each node may include a scheduler agent 260. The scheduler agent 260 may facilitate communications between nodes. For example, the scheduler 204 in the master node may communicate with the scheduler agent 260. The scheduler agent 260 may then communicate with the storage driver 260 to perform an operation such as initiating an application container instance or unmounting a virtual volume.

In some implementations, the disks 242, 244, 244, and 246 may be accessible to the container nodes via a network. For example, the disks may be located in storage arrays containing potentially many different disks. In such a configuration, which is common in cloud storage environments, each disk may be accessible for potentially many nodes to access. A storage pool such as the pool 240 may include potentially many different disks.

According to various embodiments, the virtual storage volumes 242, 244, 244, and 246 are logical storage units created by the distributed storage system. Each virtual storage volume may be implemented on a single disk or may span potentially many different physical disks. At the same time, data from potentially many different virtual volumes may be stored on a single disk. In this way, a virtual storage volume may be created that is potentially much larger than any available physical disk. At the same time, a virtual storage volume may be created in such a way as to be robust to the failure of any individual physical disk. Further, the virtual storage volume may be created in such a way as to allow rapid and simultaneous read access by different nodes. Thus, a single virtual storage volume may support the operation of containerized applications implemented in a distributed fashion across potentially many different nodes.

According to various embodiments, a virtual volume can be replicated across multiple nodes, for instance to support read-only access by different nodes. For example, in FIG. 2, the virtual volume A 230 is replicated across Node A 210 and Node B 212.

According to various embodiments, a virtual volume can be aggregated across multiple nodes. Such a configuration may support distributed and parallel reads and writes to and from the volume. For example, the virtual volume B1 232 and the virtual volume B2 234 shown in FIG. 2 are different data portions of the same virtual volume B.

According to various embodiments, each node may be configured to implement one or more instances of one or more containerized storage applications. For example, the node A 210 includes application instances corresponding with application containers App1 218 and App2 220, while the node B 212 includes application instances corresponding with application containers App3 222 and App4 224. In some configurations, more than one instance of an application container may be implemented at once. For example, the Node N 214 includes an instance of the application container App1 218 as well as App5 226.

In particular embodiments, an application container may correspond to any of a wide variety of containerized applications. For example, as discussed with respect to FIG. 1, a containerized application may be a web server 110, an email server 112, a web application 114, a database, or any of many other types of applications.

In some embodiments, the master node 202 is configured to manage the operations of the clustered storage system. For example, the scheduler 204 at the master node 202 may be configured to receive a request to mount a virtual volume for use at a particular node. The scheduler 204 may then communicate with that node to provide instructions to mount the virtual volume.

According to various embodiments, the scheduler 204 may be implemented as standardized component of the containerized application system. The extender 206 may serve as a system to extend the functioning of the scheduler. For instance, the extender 206 may implement one or more modules that provide additional logic governing operations such as the scheduling of application container instances on distributed nodes.

In some embodiments, the scheduler 204 at the master node 202 may be configured to receive a request to load an application container instance onto a node. The scheduler 204 may then communication with the prioritization module 208 to select a suitable node and then communicate with that node to provide instructions to load the application container instance. Techniques regarding application instance prioritization are discussed in additional detail with respect to FIGS. 3 and 4.

Figure 3:
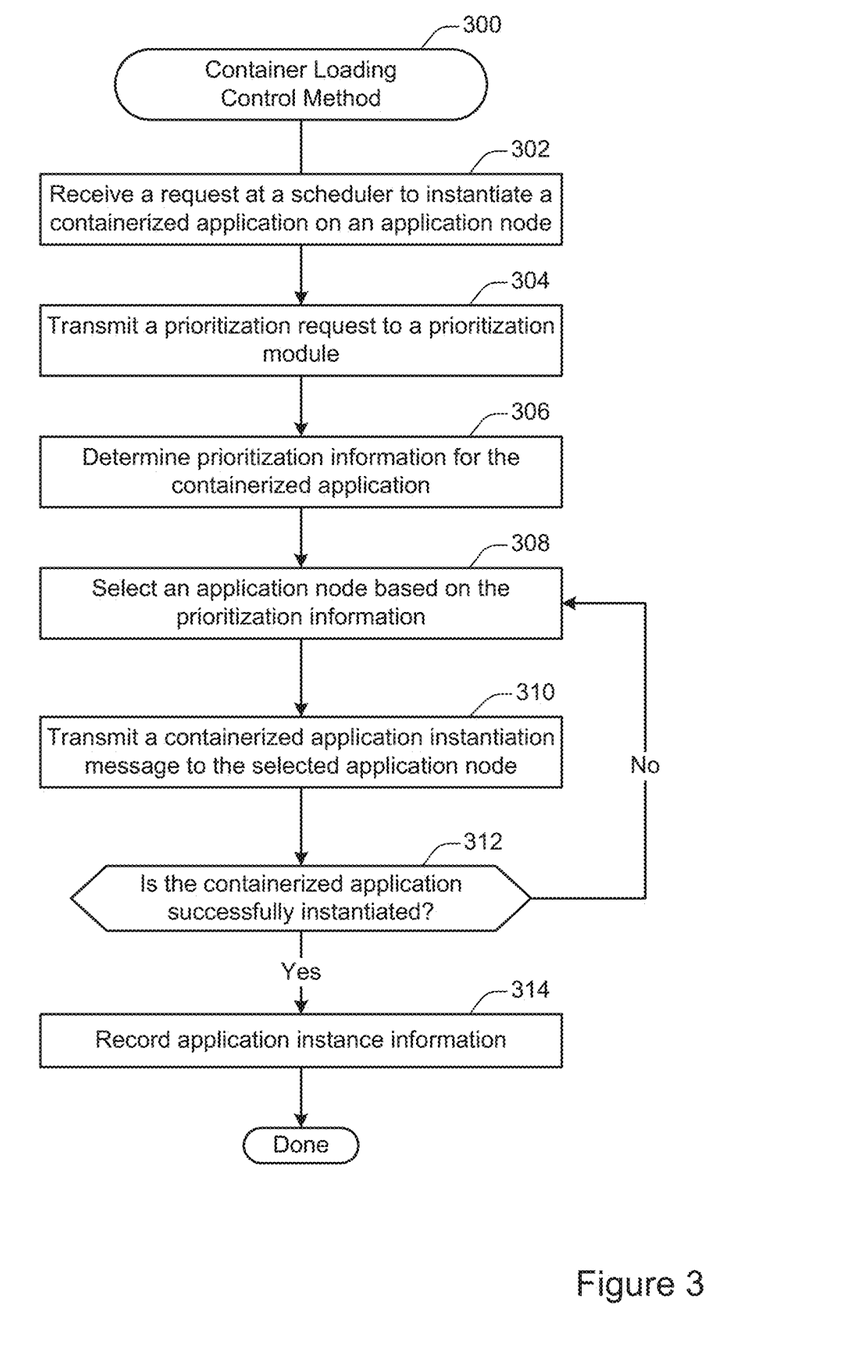
FIG. 3 illustrates an example of a method for controlling the loading of a container on a containerized application node, performed in accordance with one or more embodiments.

FIG. 3 illustrates an example of a method 300 for controlling the loading of a container on a containerized application node, performed in accordance with one or more embodiments. The method 300 may be implemented on a master node in a distributed computing system. For instance, the method 300 may be performed on the scheduler 204 shown in FIG. 2.

At 302, a request is received to instantiate a containerized application on an application node. According to various embodiments, the request may be generated in any of various ways. For example, the request may be manually generated by a systems administrator or may be generated automatically, such as in the course of executing a configuration script.

At 304, a prioritization request is transmitted to a prioritization module. According to various embodiments, the prioritization module may be implemented as an extension within a scheduler extender. The scheduler extender may serve to extend the functioning of the scheduler, which may be implemented as a native component of the containerized application system. For example, the scheduler may be implemented as a native component of a system such as Docker or Kubernetes.

At 306, prioritization information is determined for the containerized application. According to various embodiments, the prioritization information may be determined based on whether a virtual storage volume employed by a the containerized to store or retrieve data is mounted at an application node. Additional details regarding the determination of prioritization information are discussed with respect to the method 400 shown in FIG. 4.

At 308, an application node is selected based on the prioritization information. According to various embodiments, the application node that has the highest prioritization may be selected. If two application nodes have equally high prioritization, then one may be selected at random.

At 310, a containerized application instantiation message to the selected application node. According to various embodiments, the containerized application instantiation message may identify the application container for the container engine on the application node to instantiate In particular embodiments, the containerized application instantiation message may be transmitted as part of native communications between the scheduler and the application node. For example, the native scheduler application may transmit the containerized application instantiation message to a native scheduler agent at the application node via a native application procedure interface that defines the communications between these components.

At 312, a determination is made as to whether the containerized application was successfully instantiated. In some embodiments, when a scheduler agent at an application node receives a containerized application instantiation message, it may instruct the container engine at the application node to instantiate the application container. Then, when the containerized application is successfully instantiated, the scheduler may send a response message to the scheduler at the master node to confirm the instantiation.

At 314, if the instantiation is successful, then application instance information is recorded. According to various embodiments, the application instance information may be stored in a place accessible to the master node. The application instance information may indicate which application containers are instantiated on which application nodes.

Figure 4:
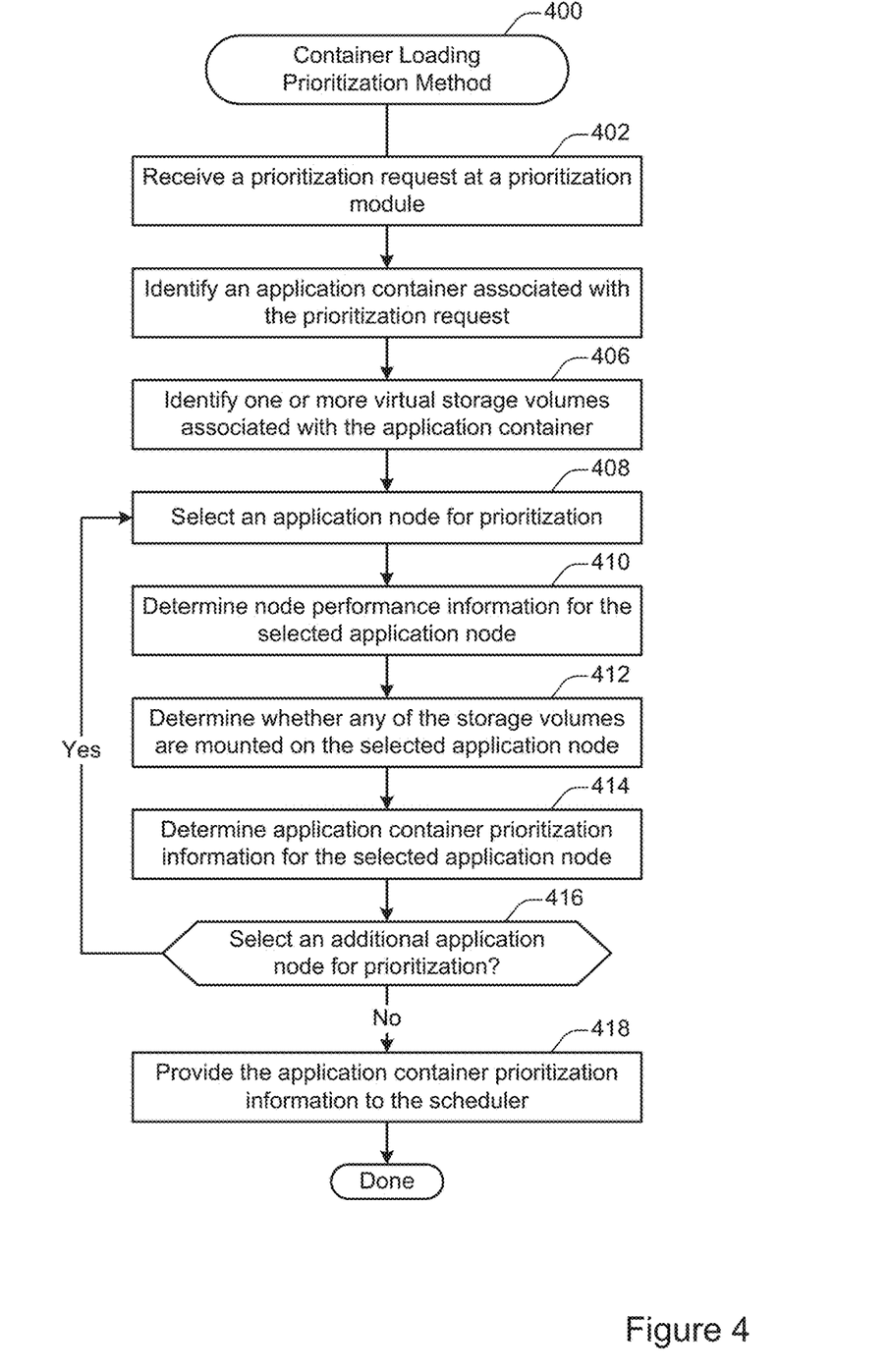
FIG. 4 illustrates an example of a method for prioritizing container loading, performed in accordance with one or more embodiments.

FIG. 4 illustrates an example of a method 400 for prioritizing container loading, performed in accordance with one or more embodiments. The method 400 may be performed at one or more components implemented on a master node in a distributed computing system. For instance, the method 400 may be performed at the prioritization module 208 shown in FIG. 2.

At 402, a prioritization request is received. According to various embodiments, the prioritization request may identify one or more application containers identified for scheduling by the scheduler. In some instances, the request may identify a number of instances of an application container to be scheduled. As part of the prioritization request from the scheduler to the extension, the scheduler can pass in details about containers such as the volumes that are being used by the container.

At 404, an application container associated with the prioritization request is identified. An application container may be identified by, for instance, a unique identification number associated with the application container. Such an identifier may be included with the request received at operation 402.

At 406, one or more virtual storage volumes associated with the application container is identified. According to various embodiments, a virtual storage volume may be identified as being associated with the application container instances based on configuration information. For example, a database may include one or more entries for each application container available for instantiation on the system. The database may also indicate which virtual storage volume or volumes are associated with the application container.

In some embodiments, a virtual storage volume that is associated with an application container is one which an instance of the application container may store data on or retrieve data from. For example, if the application container includes a database application, then a virtual storage volume used to store data records included in the database may be identified as associated with the application container. As another example, if the application container includes a webserver, then a virtual storage volume used to store files served by the webserver may be identified as associated with the application container.

In particular embodiments, information about which storage volumes are mounted on each application node may be maintained at the master node. For example, the scheduler at the master node may maintain a database that includes such information. As another example, a storage driver implemented at the master node may be configured to provide such information upon request.

At 408, an application node is selected for prioritization. According to various embodiments, the application nodes may be prioritized sequentially, in parallel, or in any suitable order.

At 410, node performance information is determined for the selected application node. In some embodiments, the node performance information may include any information characterizing a current state of software and/or hardware associated with the selected application node. For example, the node performance information may indicate whether the selected application node is in a failed, errored, or non-responding state. As another example, the node performance information may indicate a portion or amount of used or unused computing resources such as memory or processor time at the selected application node. In particular embodiments, node performance information may not be used by the scheduler extension, and may instead be used by the native scheduler, for instance to break ties in node priority as provided by the scheduler extension.

At 412, a determination is made as to whether any of the storage volumes associated with the application container are mounted on the selected application node. In some implementations, information about which storage volumes are mounted on each application node may be maintained at the master node. For example, the scheduler at the master node may maintain a database that includes such information. As another example, a storage driver implemented at the master node may be configured to provide such information upon request.

At 414, application container prioritization information is determined for the selected application node. According to various embodiments, any of various prioritization schemes may be used. For example, each node may be assigned a score between 0 and 1, between 0 and infinity, or along any suitable range. Regardless of the particular scheme, an application node may be assigned a higher priority for an application instance when that application node has mounted thereon one or more virtual volumes used by the application container corresponding with the instance.

At 416, a determination is made as to whether to select an additional application node for prioritization. According to various embodiments, successive application nodes may be selected for prioritization until all, or a suitable proportion, of the identified application nodes are prioritized. At 418, the application container prioritization information is provided to the server if no additional application container nodes are selected for prioritization.

FIG. 5 illustrates one example of a server. According to particular embodiments, a system 500 suitable for implementing particular embodiments of the present invention includes a processor 501, a memory 503, an interface 511, and a bus 515 (e.g., a PCI bus or other interconnection fabric) and operates as a container node. When acting under the control of appropriate software or firmware, the processor 501 is responsible for implementing applications such as an operating system kernel, a containerized storage driver, and one or more applications. Various specially configured devices can also be used in place of a processor 501 or in addition to processor 501. The interface 511 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 500 is a server configured to run a container engine. For example, the system 500 may be configured as a storage container node as shown in FIGS. 1 and 2. The server may include one or more hardware elements as shown in FIG. 5. In some implementations, one or more of the server components may be virtualized. For example, a physical server may be configured in a localized or cloud environment. The physical server may implement one or more virtual server environments in which the container engine is executed. Although a particular server is described, it should be recognized that a variety of alternative configurations are possible. For example, the modules may be implemented on another device connected to the server.

Figure 6:
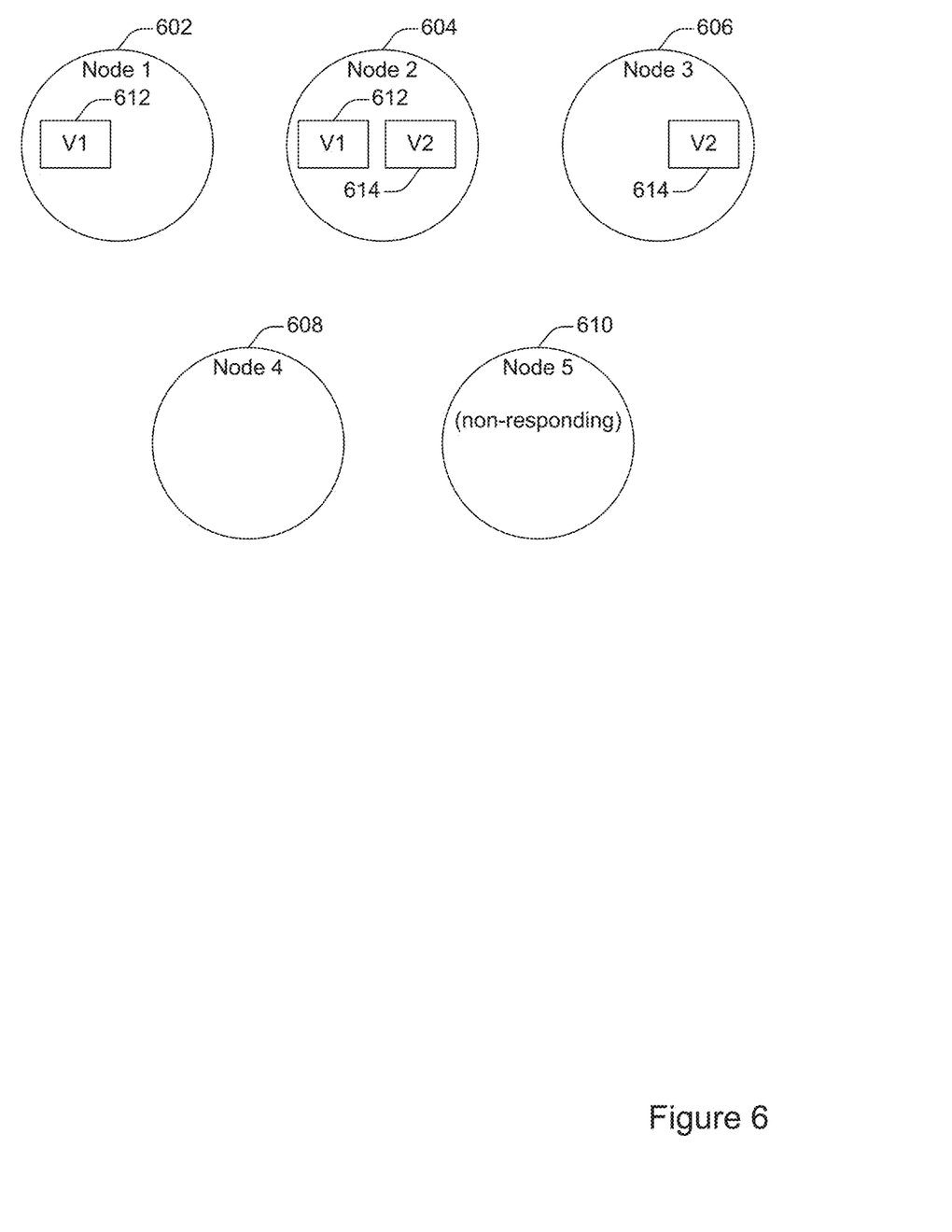
FIG. 6 illustrates an example of a configuration of nodes, provided in accordance with one or more embodiments.

FIG. 6 shows an example configuration of nodes 602, 604, 606, 608, and 610. Virtual storage volume V1 612 is mounted at node 602 and node 612. Virtual storage volume V2 614 is mounted at node 604 and node 606. Suppose for the purpose of illustration that an application is prioritized for instantiation in the configuration of nodes shown in FIG. 6. Suppose further that the application prioritized for instantiation involves access to both volume V1 612 and volume V2 614. In this situation, Node 5 610 may be assigned a prioritization of 0 because it is not responding to requests and therefore may be in an errored or failed state. Node 4 608 may be assigned a prioritization of 10 because it is available for instantiation but has neither V1 612 nor V2 614 mounted thereon. Node 1 602 and Node 3 606 may each be assigned a prioritization of 100 because they each have one of the virtual storage volumes mounted thereon. Node 2 604 may be assigned a prioritization of 200 because it has both of the virtual storage volumes mounted thereon.

Figure 7:
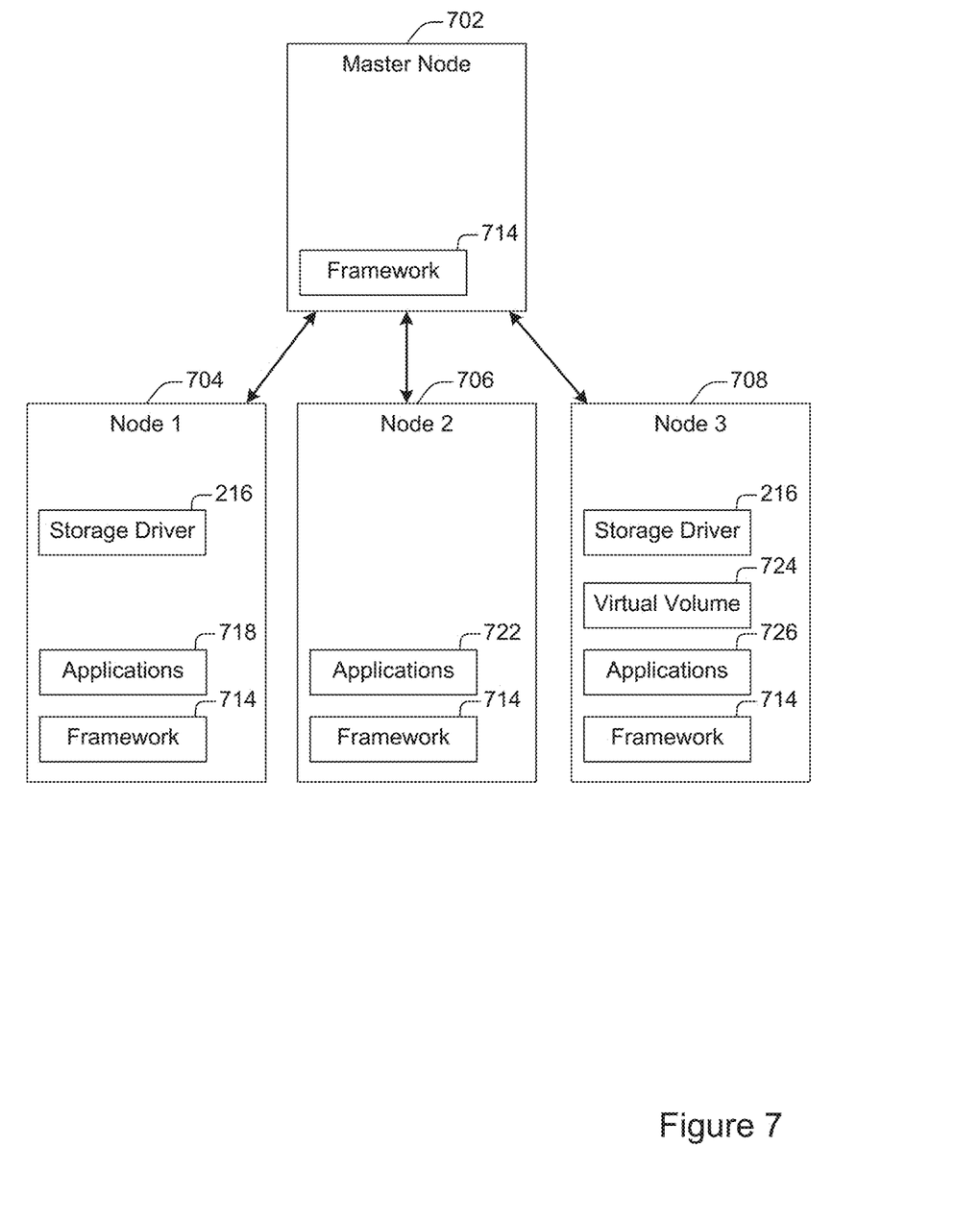
FIG. 7 illustrates an example of a configuration of nodes, provided in accordance with one or more embodiments.

FIG. 7 shows an alternate configuration of nodes and components, provided in accordance with one or more embodiments. FIG. 7 includes a master node 702 in communication with node 1 704, node 3 2 706, and node 3 708. As with other configurations shown herein, a system many include various numbers and configurations of nodes.

In the example shown in FIG. 7, the master node 702 includes a framework 714, which is also present on each of node 1 704, node 3 2 706, and node 3 708. According to various embodiments, the framework 704 may correspond to an instantiation of Apache Mesos. As such, the framework may be used to schedule tasks and/or manage resources among the various nodes. The framework at the master node 702 may be configured to identify and track resources on the dependent nodes, which include node 1 704, node 3 2 706, and node 3 708.

Each dependent node may have one or more containerized applications, including applications 718, applications 722, and applications 726. One or more dependent nodes may also include an instance of the storage driver 216. In addition, one or more dependent nodes may also have mounted thereon one or more virtual volumes, such as the virtual volume 724.

According to various embodiments, computing resources such as CPU time, communication ports, and memory space may be available on one or more of the nodes shown in FIG. 7. When a framework at a focal node receives a request to schedule or a task, it may receive offers of resources on other nodes in the system from the framework at the master node. Each resource offer may designate one or more of the nodes and indicate the resources available on the designated nodes. The focal node may then accept or reject the resource offer. When a resource offer is accepted, the focal node may schedule the task for execution on the designated node associated with the resource offer.

Figure 8:
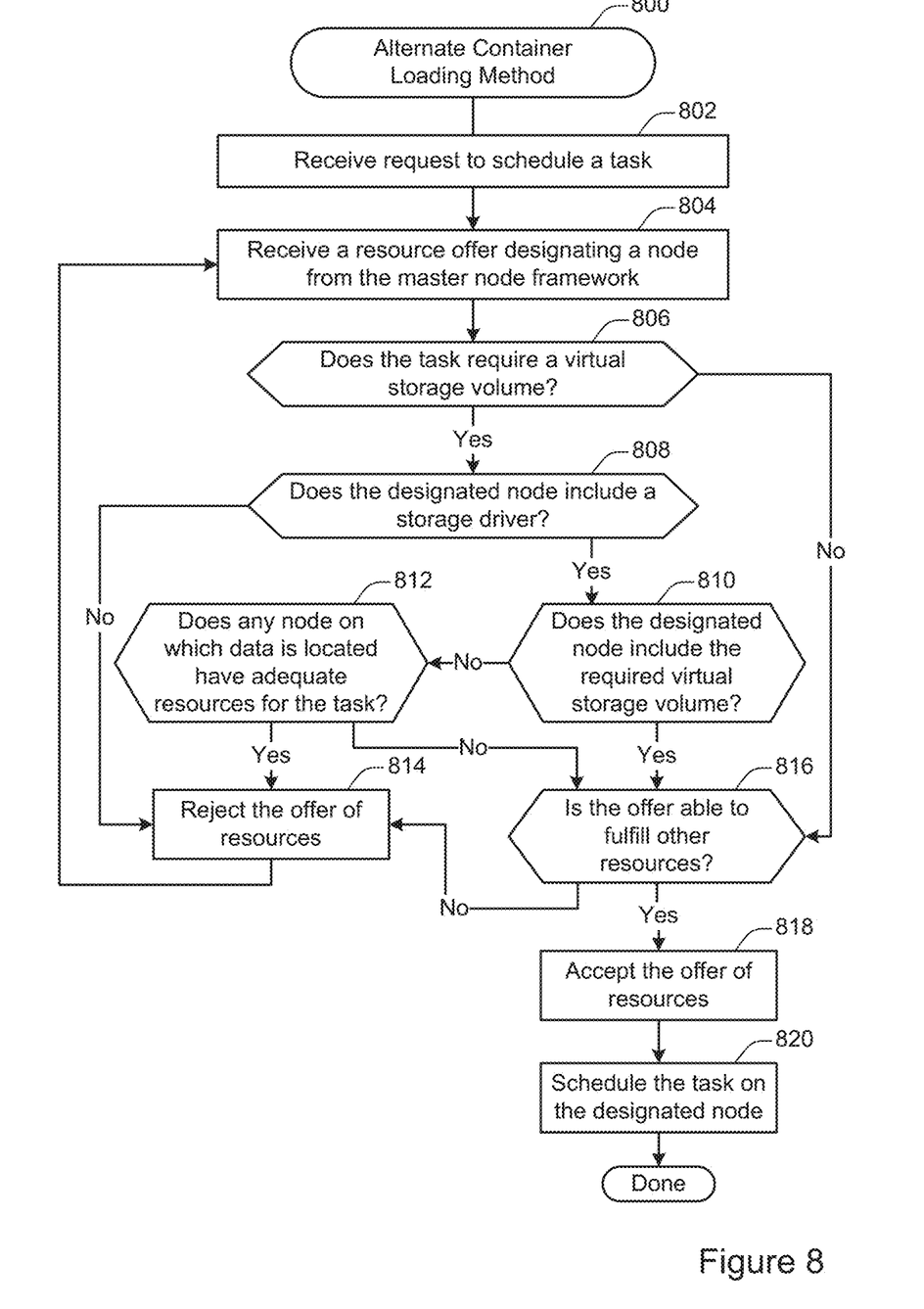
FIG. 8 illustrates an example of an alternate method for container loading, performed in accordance with one or more embodiments.

FIG. 8 illustrates an alternate method 800 for container loading, configured in accordance with one or more embodiments. The method 800 may be implemented at a focal node, such as any of the nodes shown in FIG. 7. At 802, a request to schedule a task is received at a framework on a focal node. The request may be received from an application, from a systems administrator, from a configuration script, or from any other source. The request may indicate a particular task, such as the instantiation of a containerized application. The request may also indicate one or more virtual volumes associated with the execution of the task.

At 804, a resource offer designating a node is received from the framework at the master node. According to various embodiments, the framework at the master node may track resources available on each of the dependent nodes in the system. For instance, the framework at the master node may receive a message from the focal node indicating that a task needs to be scheduled. The framework at the master node may then review the resources available on nodes in the cluster and respond to the message with an offer of resources on one or more of the dependent nodes. The offer may specify information such as an amount of CPU time or cores, one or more communication ports, and/or an amount of memory storage available on one or more of the dependent nodes.

At 806, a determination is made as to whether the task requires access to a virtual storage volume. According to various embodiments, information about the storage volumes access by the task may be included with the request received at operation 802. Alternately, or additionally, the system may maintain a record such as a database that indicates which virtual volumes are required by which containerized applications.

At 808, a determination is made as to whether the designated node includes an instance of the storage driver. According to various embodiments, the determination may be made in any of various ways. For example, each instance of the storage driver on a node within the cluster may maintain a record of which other nodes also include an instance of the storage driver. As another example, the storage driver at the focal node may communicate with the designated node to determine whether an instance of the storage driver is present.

At 810, a determination is made as to whether the required virtual storage volume is mounted at the designated node. The determination may be made in any of various ways. For example, the storage driver at the focal node may communicate with the storage driver at the designated node, the master node, or any other node to identify this information.

At 812, if the designated node does not include the virtual storage volume, a determination is made as to whether any node on which the virtual storage volume is mounted includes sufficient resources for the task. According to various embodiments, the determination may be made at least in part based on communication with the mater node. For example, the framework at the focal node may request from the master node an indication of which resources are available on which nodes in the system.

At 816, a determination is made as to whether the offer is able to fulfill other resources associated with the task. For example, the offer may specify resources such as CPU time, memory space, communication ports, and other such resources. The task may also be associated with one or more resource requirements associated with the execution of the task. Accordingly, before accepting the resource offer, the system may determine whether the resource offer includes sufficient resources for the execution of the task.

At 814, the offer of resources is rejected. The offer of resources may be rejected if the task requires a virtual storage volume and the designated node does not include the storage driver, since in this case the virtual storage volume may be inaccessible. The offer of resources may also be rejected if another node both has the required virtual storage volume mounted thereon and has adequate resources for executing the task, since in this case the focal node may wait to receive an offer for resources on that other node to achieve hyperconvergence.

At 818, the offer of resources is accepted. At 820, the task is scheduled on the designated node. According to various embodiments, accepting the offer of resources and scheduling the task may involve transmitting one or more messages or instructions to the master node and/or the designated node. The messages or instructions instruction may include such information as an identifier associated with the offer of resources and information identifying the task to be executed.

In particular embodiments, an acceptance of a resource offer may indicate a portion of the total amount of offered resources. For example, a resource offer may specify 2 CPU cores and 8 GB of RAM. If the task requested for scheduling requires fewer resources than those offered, then the acceptance of the resource offer may specify, for instance, 1 CPU core and 4 GB of RAM. By specifying the amount of resources accepted, these resources may then be reserved on the designated node for the execution of the scheduled task.

According to various embodiments, one or more of the operations described in FIG. 8 may be performed by a default scheduler native to the container management engine. In addition, one or more of the operations shown in FIG. 8 may be performed by a scheduler extension, as discussed herein. For example, one or more of operations 806, 808, 810, 812, or 814 may be implemented by a scheduler extension.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A computing system comprising:
a master node that includes a scheduler and a prioritization module, the master node being in communication with each of a plurality of containerized application nodes via a network, the prioritization module configured to determine node prioritization information indicating a relative prioritization of the containerized application nodes for instantiating a designated containerized application, the designated containerized application being configured to access one or more virtual storage volumes, wherein determining node prioritization information includes assigning a priority score to a candidate containerized application node, wherein higher priority is given based on the number of volumes stored on the candidate containerized application node that is designated for access by the designated containerized application.

2. The computing system recited in claim 1, wherein the master node and each of the plurality of containerized application nodes includes a respective instance of a container engine application executed by an operating system, the container engine application providing a standardized platform for the instantiation and execution of the containerized applications.

3. The computing system recited in claim 1, wherein a scheduler is a native component of the container engine application.

4. The computing system recited in claim 3, wherein the prioritization module is implemented via a scheduler extender that supports a plurality of modules that extend the logic of the scheduler, the plurality of modules including the prioritization module.

5. The computing system recited in claim 1, wherein instantiated containerized applications at each of the containerized application nodes includes a storage driver.

6. The computing system recited in claim 1, wherein the prioritization information for the designated containerized application nodes is determined at least in part based on whether the designated containerized application node is in a failed, non-response, or errored state.

7. The computing system recited in claim 1, wherein the prioritization information for the designated containerized application nodes is determined at least in part based on node performance information indicating a computing workload associated with the containerized application node.

8. A method comprising:
receiving a request to instantiate a designated containerized application on one of a plurality of containerized application nodes;
determining node prioritization information at a prioritization module implemented on a master node, the master node being in communication with each of the containerized application nodes via the network, the prioritization module configured to determine node prioritization information indicating a relative prioritization of the containerized application nodes for instantiating a designated containerized application, the designated containerized application being configured to access one or more virtual storage volumes, wherein determining node prioritization information includes assigning a priority score to a candidate containerized application node, wherein higher priority is given based on the number of volumes stored on the candidate containerized application node that is designated for access by the designated containerized application;
selecting one of the containerized application nodes at which to instantiate the designated containerized application based on the prioritization information; and
transmitting an instruction via a network to the selected containerized application nodes to instantiate the designated containerized application.

9. The method recited in claim 8, wherein the master node and each of the plurality of containerized application nodes includes a respective instance of a container engine application executed by an operating system, the container engine application providing a standardized platform for the instantiation and execution of the containerized applications.

10. The method recited in claim 9, wherein a scheduler is a native component of the container engine application.

11. The method recited in claim 10, wherein the prioritization module is implemented via a scheduler extender that supports a plurality of modules that extend the logic of the scheduler, the plurality of modules including the prioritization module.

12. The method recited in claim 8, wherein instantiated containerized applications at each of the containerized application nodes includes a storage driver.

13. The method recited in claim 8, wherein the prioritization information for the designated containerized application nodes is determined at least in part based on whether the designated containerized application node is in a failed, non-response, or errored state.

14. The method recited in claim 8, wherein the prioritization information for the designated containerized application nodes is determined at least in part based on node performance information indicating a computing workload associated with the containerized application node.

15. One or more non-transitory machine readable media having instructions stored thereon for performing a method, the method comprising:
receiving a request to instantiate a designated containerized application on one of a plurality of containerized application nodes;
determining node prioritization information at a prioritization module implemented on a master node, the master node being in communication with each of the containerized application nodes via the network, the prioritization module configured to determine node prioritization information indicating a relative prioritization of the containerized application nodes for instantiating a designated containerized application, the designated containerized application being configured to access one or more virtual storage volumes, wherein determining node prioritization information includes assigning a priority score to a candidate containerized application node, wherein higher priority is given based on the number of volumes stored on the candidate containerized application node that is designated for access by the designated containerized application;
selecting one of the containerized application nodes at which to instantiate the designated containerized application based on the prioritization information; and
transmitting an instruction via a network to the selected containerized application nodes to instantiate the designated containerized application.

16. The one or more machine readable media recited in claim 15, wherein the master node and each of the plurality of containerized application nodes includes a respective instance of a container engine application executed by an operating system, the container engine application providing a standardized platform for the instantiation and execution of the containerized applications.

17. The one or more machine readable media recited in claim 16, wherein a scheduler is a native component of the container engine application.

18. The one or more machine readable media recited in claim 17, wherein the prioritization module is implemented via a scheduler extender that supports a plurality of modules that extend the logic of the scheduler, the plurality of modules including the prioritization module.

19. The one or more machine readable media recited in claim 15, wherein instantiated containerized applications at each of the containerized application nodes includes a storage driver.

20. The one or more machine readable media recited in claim 15, wherein the prioritization information for the designated containerized application nodes is determined at least in part based on whether the designated containerized application node is in a failed, non-response, or errored state.

\* \* \* \* \*